United States Patent [19]
Keller et al.

[11] 3,935,062
[45] Jan. 27, 1976

[54] NUCLEAR POWER PLANT WITH A SAFETY ENCLOSURE

[75] Inventors: Wolfgang Keller, Erlangen; Joachim Krüger, Forchheim; Johann Ropers, Erlangen, Dechsendorf; Hans-Peter Schabert, Erlangen, all of Germany

[73] Assignee: Siemens Aktiengesellschaft, Munich, Germany

[22] Filed: Apr. 24, 1973

[21] Appl. No.: 353,998

[30] Foreign Application Priority Data
Apr. 26, 1972    Germany.......................... 2220491

[52] U.S. Cl............................................. 176/30
[51] Int. Cl.²........................................ G21C 19/20
[58] Field of Search ..................... 176/30–32; 214/18 N

[56] References Cited
UNITED STATES PATENTS

| | | |
|---|---|---|
| 3,190,805 | 6/1963 | Straub et al. .................... 176/30 |
| 3,513,070 | 5/1970 | Margen et al..................... 176/31 |
| 3,637,096 | 12/1972 | Crate .................................. 176/30 |
| 3,765,549 | 10/1973 | Jones ................................. 176/30 |

*Primary Examiner*—Samuel Feinberg
*Attorney, Agent, or Firm*—Kenyon & Kenyon Reilly Carr & Chapin

[57] ABSTRACT

A nuclear power plant has a safety enclosure for a nuclear reactor. A fuel element storage basin is also located in this safety enclosure and a fuel element lock extends through the enclosure, with a cross-sectional size proportioned for the endwise passage of fuel elements, the lock including internal and external valves so that a fuel element may be locked endwise safely through the lock. The lock, including its valves, being of small size, does not materially affect the pressure resistance of the safety enclosure, and it is more easily operated than a lock large enough to pass people and fuel element transport vessels.

10 Claims, 6 Drawing Figures

NUCLEAR POWER PLANT WITH A SAFETY ENCLOSURE

BACKGROUND OF THE INVENTION

This invention relates to a nuclear power plant having a safety enclosure which encloses the nuclear reactor. A high pressure is potentially possible on the inside of the enclosure and must be contained against escape to the outside. The fuel element storage basin is also located on the inside of the safety enclosure beside the reactor so that the reactor's fuel elements can be changed expeditiously.

More particularly, the invention is concerned with a light-water reactor, particularly a pressurized-water reactor, having a pressure containment system requiring the safety enclosure. To change fuel elements, a space above the reactor and the fuel element storage basin is flooded with water. The fuel elements are transported to and from the storage basin while immersed under water in fuel element transport vessels, so that the after-decay heat is removed and shielding is provided. People must pass into and from the safety enclosure with the large and heavy transport vessels, the safety enclosure having an adequately large lock for this purpose. Remote-controlled equipment inside of the safety enclosure is provided for moving the fuel elements between the reactor and storage basin, but special crane equipment is required to handle the transport vessels. The lock, proportioned to pass the people and transport vessels, involves operational difficulties.

SUMMARY OF THE INVENTION

One of the objects of the present invention is to avoid the need for people and the fuel element transport vessels to be on the inside of the safety enclosure while fuel elements are being transferred between these vessels and the fuel element storage basin inside of the safety enclosure.

According to the invention, the safety enclosure is provided with a fuel element lock, separate from the large lock, having a cross-sectional size dimensioned to permit the endwise or lengthwise passage of a fuel element. This lock has inside and outside valves which when open permit the element to pass, the space between these valves being long enough to accommodate a fuel element when located endwise within the lock. The inside end of the lock is in the water in the fuel element storage basin and means are provided for transferring elements between the inner end of the lock and the fuel element storage basin, with the elements inserted and removed endwise through the lock's inner end. On the outside of the safety enclosure means are provided for handling the fuel elements between that end of the lock and fuel element transport vessels while the elements are constantly immersed in water. The lock valves and these means can be of the remote-controlled type.

The fuel elements can be exchanged between the reactor and the fuel element storage basin inside of the safety enclosure in the usual manner by remote-controlled equipment. This does not require passage through the safety enclosure. With this invention it is also unnecessary to pass through the safety enclosure to exchange fuel elements between the fuel element storage basin and the fuel element transport vessels or to pass these vessels through the safety enclosure. Furthermore, the fuel elements may be thus exchanged even during the operation of the reactor when the safety enclosure is closed pressure-tight.

The safety enclosure is made of steel and is in the form of a large sphere protected externally by a thick-walled shell. The fuel element lock may comprise a metal tube having a diameter which is not substantially larger than is needed to pass the fuel elements endwise through it, this tube passing through the steel safety enclosure and being connected to it in a fluid-tight manner. This may be by welding the tube directly to the safety enclosure or via an adequately strong metallic bellows or the like in case the latter is indicated to compensate for movement of the tube relative to fixed parts.

BRIEF DESCRIPTION OF THE DRAWINGS

Preferred embodiments of the present invention are illustrated by the accompanying drawings in which the various figures are as follows.

DESCRIPTION OF THE PREFERRED EMBODIMENTS

Figure 1:
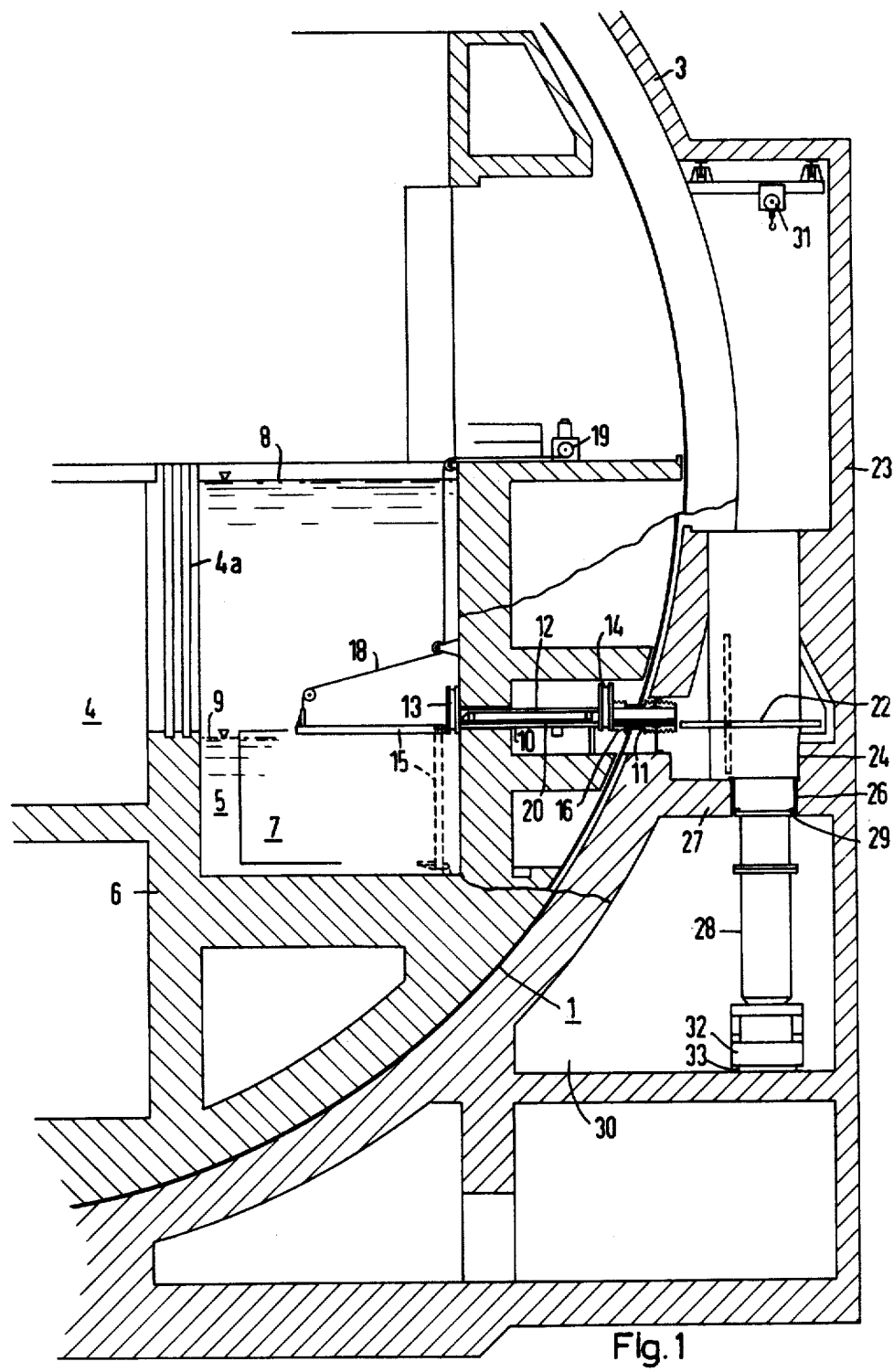
FIG. 1 is a vertical section taken through the side of a nuclear reactor safety enclosure and showing elements of the invention.
Figure 2:
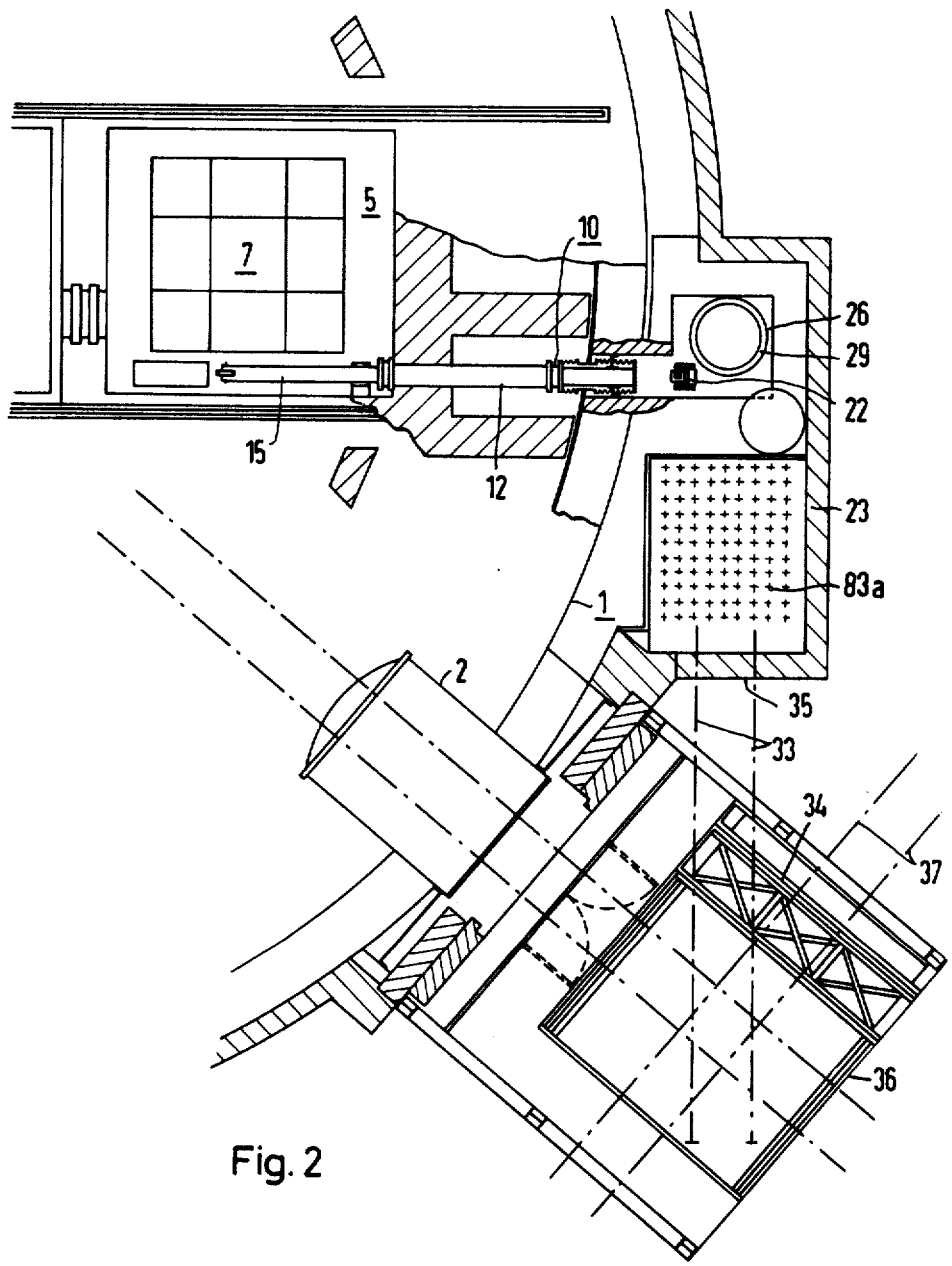
FIG. 2 is a horizontal section of the parts shown by FIG. 1.

The form of the invention shown by FIGS. 1 and 2 involves a horizontally positioned fuel element lock tube arrangement.

In detail, the safety enclosure of a pressurized-water power reactor for, say 1,000 MWe, is shown at 1, it comprising a large steel sphere which encloses the reactor pressure vessel and the essential elements of the primary cooling circuit (not shown). The safety enclosure is shown with the large lock 2 designed for the largest elements that would ordinarily have to be transported to within the safety enclosure. In the absence of the present invention the fuel element transport vessels accompanied by people would have to pass through this lock. This requirement is an indication of the necessary size of this lock, making its pressure resistant doors very large and requiring locking mechanisms which can be manipulated only with difficulty. When this lock 2 is used, the reactor cannot be in operation.

The steel safety enclosure 1 is itself enclosed by a mechanically strong outer enclosure 3. Inside of the safety enclosure 1 a space 4 is provided above the reactor pressure vessel and which is flooded with water during fuel element changing, and beside this space there is located a fuel element storage basin 5 formed by walls 6 and containing a storage rack 7 for the nuclear fuel elements which are located below the normal water level 8. For an actually constructed reactor, for example, 121 or 157 fuel elements are used, each usually being of square cross section and having dimensions of, for example, 220 × 220 mm. and a length of between 3 and 4 m, which corresponds to the height of the reactor core. At least half of these fuel elements can be accommodated in the fuel element storage basin 5. By remote-controlled equipment (not shown) the elements can be exchanged between the reactor and the basin via a gate 4a when the water level 8 is correspondingly maintained in the space 4.

The minimum liquid level 9 of the water in the basin 5 is shown by a dash-dotted line, this designating the level of the quantity of water which must be present in the fuel element storage basin as a minimum so that even in an emergency, sufficient cooling of the stored fuel elements is assured. It is to be understood that circulating water is involved so that the water can be an effective cooling medium. However, during normal operation, and particularly for the exchanging of fuel elements between the storage basin and the reactor, the high water level 8 is used.

Between these two liquid levels 8 and 9 and at a level a little above that of elements stored in the basin 5, the horizontal fuel element, lock tube 10 is provided which is connected with the safety enclosure at 11 in a pressure-tight manner. The lock chamber 12 inside of the tube 10 can be closed at both ends by two gate valves 13 and 14 which may be of the remote-controlled type, by which is meant any of the prior art arrangements for effecting operation from outside of the safety enclosure. Of these, the inner gate valve 13 is fluid-tightly connected with the adjacent wall of the fuel element storage basin 5; the outer gate valve is fluid-tightly connected to the part of the lock tube 10 which is adjacent to the safety enclosure to which the outer end of the lock tube is connected at 11 in a pressure-tight manner.

To transport the fuel elements (not shown), they are raised out of the rack 7 of the storage basin 5 by means of a tilting device 15, to which they may be moved by the usual handling equipment (not shown). Through a cable 18 operated by a remote-controlled positioning drive 19, the elements are turned from their vertical position to a horizontal position and in this position they are brought into the lock tube 10, the valve 13 being opened. A carriage 20 is used for this purpose which after passing through the lock can be brought back into the vertical position in a second tilting device 22 on the outside of the safety enclosure 1.

This tilting device 22 is part of a loading station 24 which is located in an outer building 23 as part of the outer enclosure 3 which surrounds the safety enclosure 1. This loading station 24 is designed so that it can be flooded with water for loading and unloading fuel elements into or from the storage basin 5 via the fuel element lock tube 10. This station has a loading opening 26 in its bottom 27, and to the lower end of this opening 26 the top of a fuel element transport vessel 28 can be connected to a liner 29 lining the opening 26. This can be done fluid-tightly so that the space 30 formed by the outer building 23 does not have to be flooded with water when the loading station 24 above it is flooded. With the tilting device 22 constructed to pivot at a point spaced between its opposite ends, it is possible to reduce the vertical clearance required when it tilts to turn a fuel element between vertical and horizontal positions.

The tilting device 22 must be registered with the outer end of the fuel element lock 10, but the opening 26 can be offset because a traveling crane 31, running on a trackway extending tangentially with respect to the safety enclosure 1, may be used for loading and unloading of the transport vessel 28. The latter stands on a dolly 32 which can move on tracks 33 which, as shown in FIG. 2, lead from the loading station 24 to a steel scaffolding 36 through a pressure-resistant door 35, which may be part of a pneumatic lock. At this scaffolding 36 a lifting device in the form of a traveling crane 34 is provided to handle reactor parts and the like for passage through the large lock tube when required. By means of this crane 34 a transport vessel 28 can be removed from the dolly 32 and, for example, placed on a railroad train running to the nuclear power plant on tracks 33.

In connection with the foregoing, it is to be understood that the normal equipment (not shown) provided in the safety enclosure 1 for handling the fuel elements for other purposes, may be used to convey the fuel elements to the tilting device 15 over which the carriage 20 can be run to receive the element when the devicce 15 is in its vertical position, the carriage and device then being pulled to the horizontal position and pushed into chamber 12 within the lock tube 10. The reverse action is involved when a fuel element is to be passed from the outside of the safety enclosure to the storage basin 5.

Figure 3:
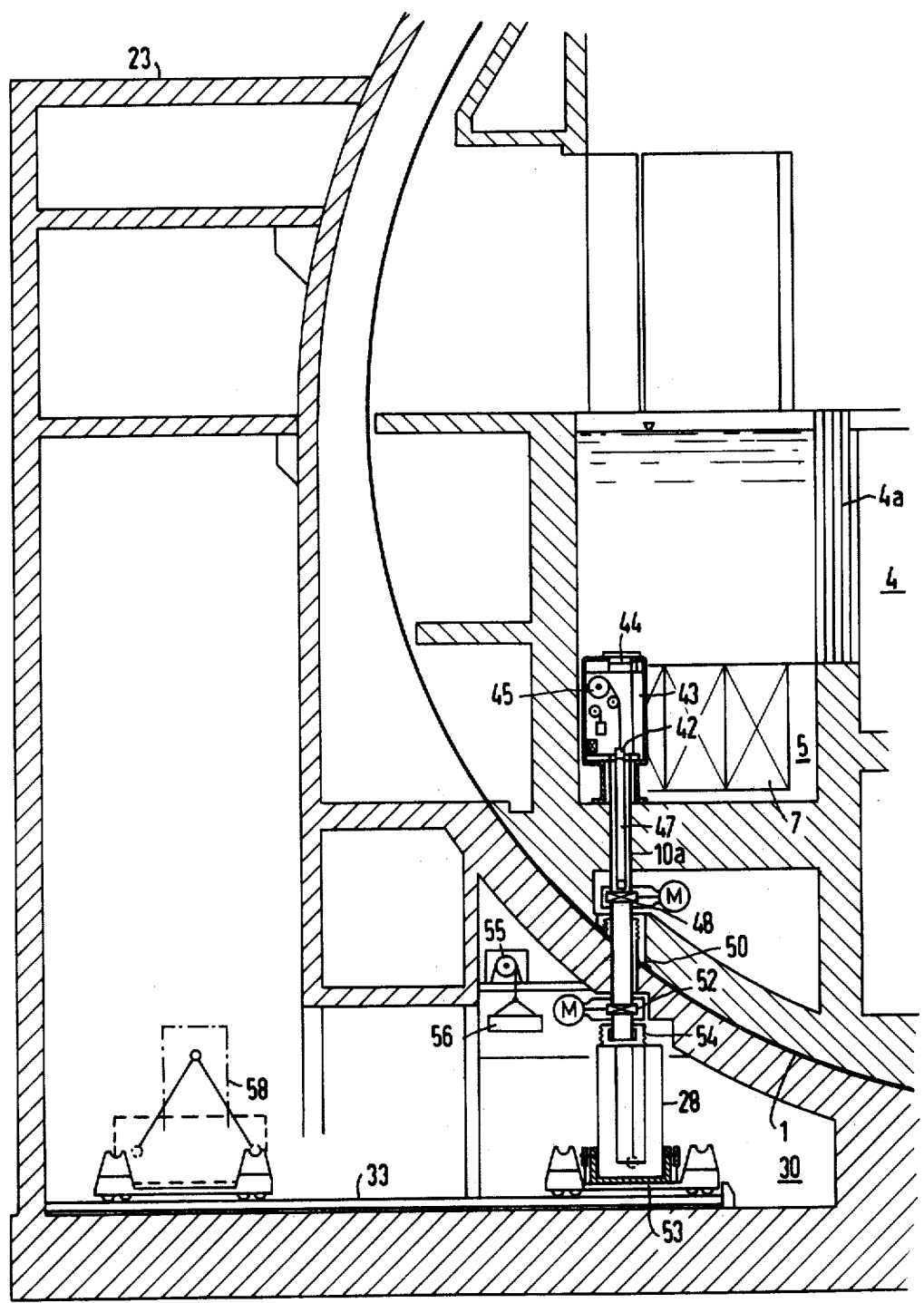
FIG. 3 is like FIG. 1 but shows a modification.

In FIG. 3 a vertical fuel element lock arrangement is shown. In this figure the fuel element storage basin 5 is shown with the fuel element rack 7. In this case the fuel element lock tube 10a is at a lower level within the basin 5 and extends vertically. During transfer of the fuel elements, a fuel element is moved by the usual equipment (not shown) to a position where it is gripped by its upper portion by means of a gripper 42 which is arranged in an enclosing housing 43 having a top opening closed by a sliding valve 44. The gripper is raised or lowered by a winch 45. The fuel elements can be inserted through this valve 44, when opened, by the usual loading machine (not shown) which normally takes care of transporting the fuel elements between the storage basin 5 and the reactor pressure vessel located below the space 4. After the sliding valve 44 is closed, the housing is made to be pressure-tight up to a pressure which is at least as high as that demanded of the safety enclosure 1.

A fuel element 47 is shown as being inserted into the lock tube 10a. In this case the lock tube 10a is provided with a remote-controlled valve 48, which may be operated by a motor M, for example, and is connected to the safety enclosure 1 in a fluid-tight manner, either by being welded directly to the enclosure or by means of a metallic bellows arrangement permitting relative movement between the lock tube 10 and the enclosure 1. The tube 10a has a corresponding valve 52 at its lower or outer end and a bellows 54 releasably connects this lower outer end with the top opening of a fuel element transport vessel 28. With the valve 44 closed, and the valves 48 and 54 opened, the fuel element may be moved vertically into and from the vessel 28. All of these parts are flooded with water as required for the reasons previously described. The valve 48 may be regarded as a safety measure which is closed to prevent the discharge of the water in the fuel element storage basin in the event the lock tube 10a fails so as to otherwise permit such discharge. The portion of the tube 10a above the valve 48 may be considered as essentially comprising the fuel element lock tube, the portion below it being to confine the fuel element within water as it travels between the valve 48 and the transport vessel 28. The latter is mounted on a dolly 53 which can be rolled along the tracks 33 previously described.

As shown in FIG. 3, the space 30, previously described, is unflooded. Within this space a cable winch 55 suspends a lid 56 for the transport vessel 28 and which is lowered to close the latter after the dolly 53 has traveled just a short distance from under the tube 10a. The transport vessel 28 may be pivotally carried by the dolly 53 so that after the lid 56 is applied and fixed in position by suitable means, described hereinafter, and the dolly run to its outermost position, the transport vessel may be swung from the vertical to the horizontal position as indicated at 58 in dash-dotted lines.

Figure 4:
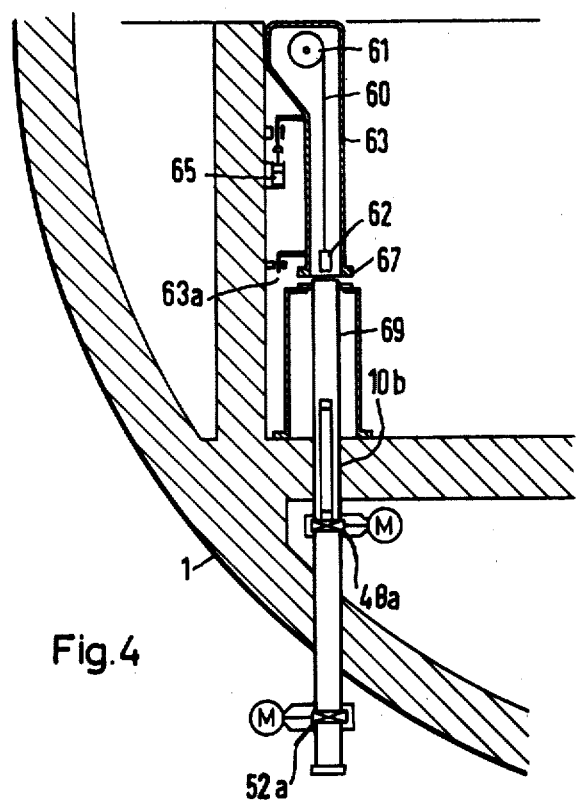
FIG. 4 is again a vertical section of a small portion of the safety enclosure and illustrating parts of the invention.

FIG. 4 shows somewhat the same arrangement as is shown by FIG. 3, the fuel element lock tube 10b being vertical, but in this case a loading machine 60 is used which transports the fuel elements from the rack 7 (not shown in this figure), into the area of the lock tube 10b. This loading machine 60 comprises a cable winch 61 with a gripper 62 in a housing 63, which latter can be pivoted as at 63a so that the gripper 62 can grip a fuel element. The pivotal arrangement permits slight vertical motion of the housing 63 so that it can be raised by a lifting arrangement 65 slightly to clear the upper end 69 of the lock tube 10b. When the housing 63 is swung vertically, while containing a fuel element picked up by the gripper 62, it may be lowered slightly to form a fluid-tight and pressure-tight seal at 67 with the upper end 69 of the lock tube 10b. The gate valves 48a and 52a correspond with the valves 48 and 52 of the FIG. 3 example.

Figure 5:
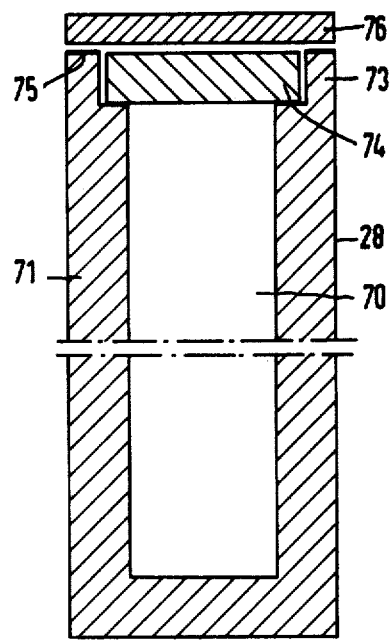
FIG. 5 is a vertical section taken through one of the fuel element transport vessels.

FIG. 5 shows the transport vessel 28 previously referred to. Its interior 70 is formed by walls 71 which provide the necessary radiation protection. In the upper end 73 which is open to pass the fuel elements, there is an enlargement or countersink providing a peripheral ledge on which the lid 74, previously referred to, may seat, this providing complete radiation proof protection. This ledge is positioned so that the top of the lid 74 is substantially flush with the upper end 73, and the lid 74 is therefore held firmly down by the application of a closure 76 which through sealing rings 75 provides for water tightness. The sealing rings 75, or equivalent sealing arrangement, seal water-tightly with the liner 29 shown in FIG. 1 or the lower ends of the lock tubes 10a and 10b shown in FIGS. 3 and 4 respectively. With the closure of plate 76 in place and clamped by suitable means (not shown), the fuel element is safely enclosed. This permits the vessel 28 to be turned horizontally as shown in FIG. 3. When transferred to another vehicle, such as a railroad vehicle, the vessel may be transported horizontally.

Figure 6:
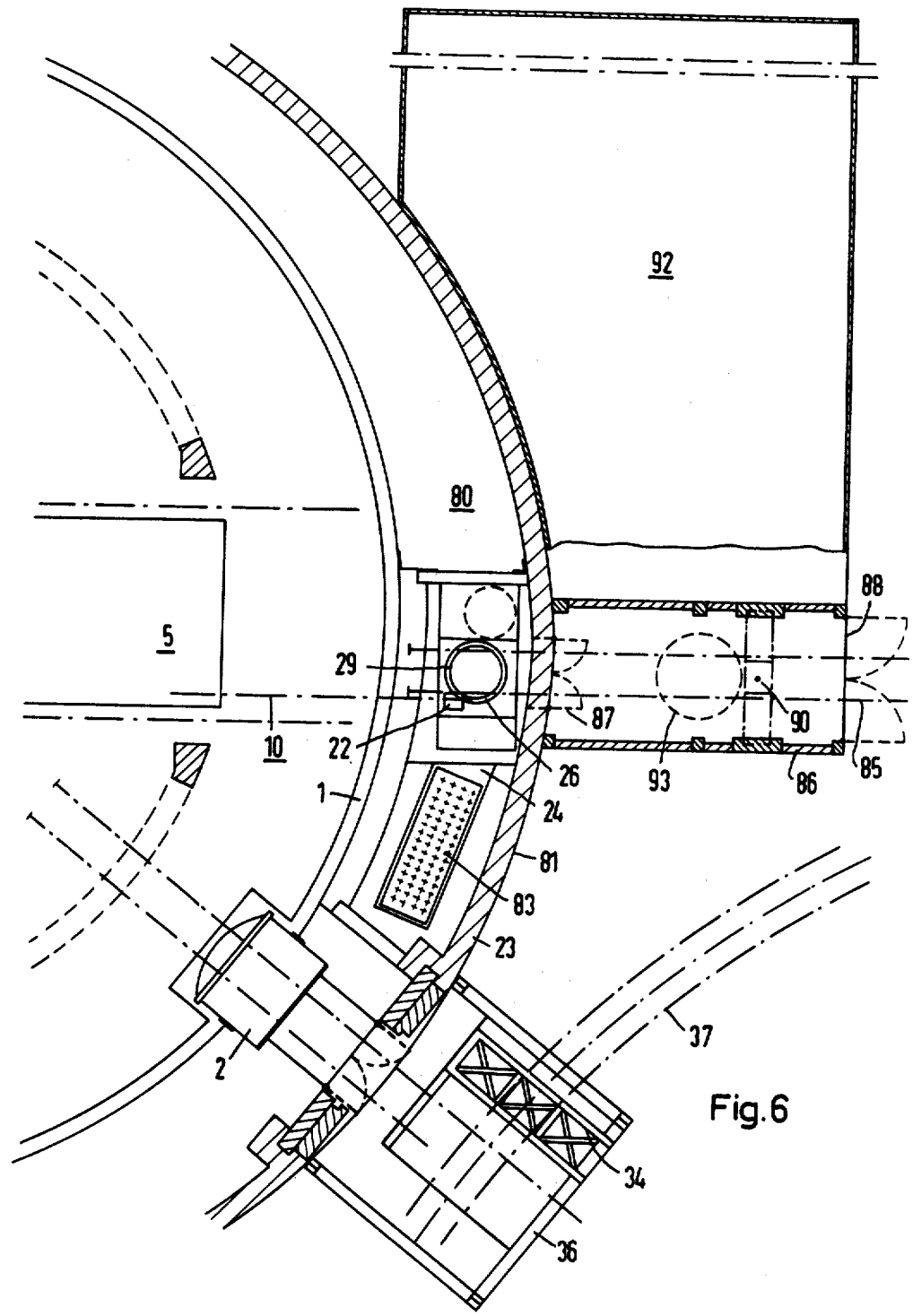
FIG. 6 is a horizontal cross section showing a form somewhat like that illustrated in FIG. 2 but showing a further modification.

FIG. 6 shows a form wherein the loading station 24 corresponds generally with that shown by FIG. 2. Thus, the loading station is shown as being located in the space 80 formed between the safety enclosure 1 and the shell structure 81 which surrounds the safety enclosure 1 eccentrically and in spaced relationship. This part 81 generally corresponds to the part 23 in FIG. 1 and encloses a storage rack 83 for new fuel elements, and all other components of the reactor installation that might conceivably be radiation carriers, such as for instance, cooling water processing equipment. A corresponding rack is shown at 83a in FIG. 2 where it is serviced by the traveling crane 31 which, of course, includes a winch, a cable, and suitable means for engaging the fuel elements.

Radially extending tracks 85 are shown adjacent to the shell structure 81 passing through a pneumatic lock 86 having interspaced doors 87 and 88, these tracks forming a transport path to and from the station 24 which may be substantially the same as the loading station 24 in FIG. 1. This pneumatic lock 86 is equipped with a hoisting facility 90, indicated by broken lines, for transferring the fuel element transport vessels from a transport vehicle associated with the loading station 24, which may be like the dolly 53 shown by FIG. 3, outwardly to a railroad car or motor truck. This transport vehicle can have a suitable device (not shown) for lifting the transport vessels tightly against and sealing with the liner 26 shown in FIG. 1. Any suitable means may be used for fluid-tight sealing at this point.

The lock 86 may be combined with an auxiliary reactor building 92 adjacent to the shell structure 81. In the case of a twin configuration of two reactor systems, this building 92 may be designed as a connection between loading stations which are associated with the respective systems. In such an instance the lock 86 may be equipped with a turntable 93, indicated by dashed lines, which leads to the door 88, this door 88 in such an instance then being arranged in the side wall separating the pneumatic lock 86 from the building 92, the opposite end of which would then connect with the fuel element loading and unloading station of the other reactor system. Such an arrangement is not illustrated by the drawings.

To emphasize the small size of the fuel element lock, for the usual fuel elements it may have a cross-sectional size of only from 0.05 to 0.3 m$^2$.

What is claimed is:

1. A nuclear power plant comprising a pressure containment shell having a personnel lock extending therethrough, means inside of said shell forming a water-floodable reactor fuel-element changing space and a water-floodable fuel-element storage basin connecting with said space, a fuel-element storage rack in said basin, a fuel-element transport vessel on the outside of said shell; a fuel-element lock extending through said shell and transversely dimensioned for the endwise passage of fuel elements therethrough, said fuel-element lock having an inner end in said basin and an outer end on the outside of said shell, means in said basin for transferring fuel-elements between said inner end and said rack, and means on the outside of said shell for transferring fuel-elements under water between said outer end and said vessel.

2. The plant of claim 1 in which said fuel-element lock has a cross-sectional size not more than about 0.3m$^2$.

3. The plant of claim 1 having an outer enclosure surrounding said shell and internally forming a substantially enclosed space outside of the shell, said vessel being removably positioned in said space and said outer enclosure having a passage for said vessel between the space and the outside of the outer enclosure.

4. The plant of claim 3 in which the fuel-element lock's said outer end is positioned at a height above said space between said shell and said outer enclosure and said vessel, and a water-floodable loading station is positioned between said outer end and said vessel and has an opening to which said transport vessel is releasably connectable for the passage of fuel elements between said station and vessel, and said station being inside of said outer enclosure and outside of said shell.

5. The plant of claim 1 in which said containment shell is a steel sphere and said fuel-element lock comprises a steel tube welded to said sphere and having pressure-resistant gate valves at said inner and outer ends of the fuel-element lock.

6. The plant of claim 5 in which said fuel element lock has a cross-sectional size not more than about 0.3m².

7. The plant of claim 5 having an outer enclosure surrounding said shell and forming en enclosed space between the enclosure and the outside of said shell, said vessel being movably positioned in said space and said outer enclosure having a passage for movement of said vessel between the enclosed space and the outside of the outer enclosure.

8. The plant of claim 5 in which the fuel-element lock's said outer end is positioned for direct connection with said vessel.

9. The plant of claim 1 in which said fuel-element changing space extends to a height substantially above the top of said fuel-element storage rack and said fuel-element storage basin extends to substantially said height and a fuel-element gate interconnects said space and basin above said rack, said basin being water-floodable to a normal level covering said rack and to said height for transferring fuel-elements between said space and basin through said gate, the fuel-element lock's said inner end in said basin being at a height at least slightly above said normal level and substantially below said height.

10. The plant of claim 9 in which said shell is a steel sphere and said fuel-element lock comprises a substantially horizontal steel tube welded to said sphere and having pressure-resistant gate valves at the said inner and outer ends of the fuel-element lock, and a mechanically strong protective enclosure surrounds said sphere and forms a water-floodable station at said outer end and having a bottom in which a fuel-element loading opening is formed, said outer enclosure forming a space below said station and in which said transport vessel is movably positioned, said vessel being releasably connectable with said opening and said outer enclosure having a passage to its outside, for said transport vessel.

* * * * *

UNITED STATES PATENT AND TRADEMARK OFFICE
CERTIFICATE OF CORRECTION

PATENT NO. : 3 935 062
DATED : January 27, 1976
INVENTOR(S) : Wolfgang Keller et al It is certified that error appears in the above-identified patent and that said Letters Patent are hereby corrected as shown below:

Column 4, line 19, delete "devicce" and substitute "device."

Column 4, line 20, delete "device" and substitute "element."

Signed and Sealed this twenty-seventh Day of April 1976

[SEAL]

Attest:

RUTH C. MASON
Attesting Officer

C. MARSHALL DANN
Commissioner of Patents and Trademarks